(12) United States Patent
Jalalibarsari et al.

(10) Patent No.: US 12,321,832 B2
(45) Date of Patent: *Jun. 3, 2025

(54) SYSTEMS AND METHODS FOR BEHAVIOR BASED MESSAGING

(71) Applicant: WALMART APOLLO, LLC, Bentonville, AR (US)

(72) Inventors: Vahid Jalalibarsari, Sunnyvale, CA (US); Wei Shen, Danville, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,156

(22) Filed: Dec. 29, 2023

(65) Prior Publication Data

US 2024/0185128 A1 Jun. 6, 2024

Related U.S. Application Data

(63) Continuation of application No. 17/991,463, filed on Nov. 21, 2022, now Pat. No. 11,861,473, which is a
(Continued)

(51) Int. Cl.
*G06N 20/00* (2019.01)
*G06F 17/18* (2006.01)
(Continued)

(52) U.S. Cl.
CPC ............. *G06N 20/00* (2019.01); *G06F 17/18* (2013.01); *G06N 7/00* (2013.01); *G06Q 30/0203* (2013.01)

(58) Field of Classification Search
None
See application file for complete search history.

(56) References Cited

U.S. PATENT DOCUMENTS 6,535,855 B1 3/2003 Cahill et al.
6,769,009 B1 7/2004 Reisman
(Continued)

OTHER PUBLICATIONS

G. E. P. Box, D. R. Cox, "An Analysis of Transformations," Journal of the Royal Statistical Society: Series B (Methodological), vol. 26, Issue 2, pp. 211-252, Jul. 1964, https://doi.org/10.1111/j.2517-6161.1964.tb00553.x, Jul. 1964. 1964.
(Continued)

*Primary Examiner* — Toan H Vu
(74) *Attorney, Agent, or Firm* — BRYAN CAVE LEIGHTON PAISNER LLP

(57) ABSTRACT

A system including one or more processors and one or more non-transitory computer-readable media storing computing instructions that, when executed on the one or more processors, cause the one or more processors to perform: calculating a first user propensity score to take first actions and a second user propensity score to take second actions based on at least one feature vector of historical data of a user; using the first user propensity score to place the user into a first segment; using the second user propensity score to place the user into a second segment different than the first segment; and facilitating a display of one or more selectable elements of a GUI for the user based on the first segment and the second segment. Other embodiments are disclosed.

20 Claims, 8 Drawing Sheets

Related U.S. Application Data continuation of application No. 16/287,686, filed on Feb. 27, 2019, now Pat. No. 11,537,937.

(51) Int. Cl.
  *G06N 7/00* (2023.01)
  *G06Q 30/0203* (2023.01)

(56) References Cited

U.S. PATENT DOCUMENTS

| | | | |
|---|---|---|---|
| 8,055,596 | B2 | 11/2011 | Bhaskar et al. |
| 8,521,128 | B1 | 8/2013 | Welsh et al. |
| 9,392,312 | B1 | 7/2016 | Lewis |
| 10,638,200 | B1 | 4/2020 | Donoghue |
| 11,004,135 | B1 * | 5/2021 | Sandler ............ G06Q 30/0631 |
| 2002/0013711 | A1 | 1/2002 | Ahuja et al. |
| 2004/0081183 | A1 | 4/2004 | Monza et al. |
| 2008/0059314 | A1 | 3/2008 | Kirchoff et al. |
| 2009/0018996 | A1 | 1/2009 | Hunt et al. |
| 2012/0054095 | A1 | 3/2012 | Lesandro et al. |
| 2014/0057610 | A1 | 2/2014 | Olincy et al. |
| 2014/0143333 | A1 | 5/2014 | Dodge |
| 2015/0019347 | A1 | 1/2015 | Naghdy |
| 2015/0036817 | A1 | 2/2015 | Jain et al. |
| 2015/0193861 | A1 | 7/2015 | Reed et al. |
| 2015/0220619 | A1 * | 8/2015 | Gray ............ G06F 16/2246 707/738 |
| 2015/0278836 | A1 | 10/2015 | Liu |
| 2015/0348095 | A1 | 12/2015 | Dixon et al. |
| 2016/0155154 | A1 | 6/2016 | Klawitter |
| 2016/0357843 | A1 | 12/2016 | Murrett |
| 2017/0300948 | A1 | 10/2017 | Chauhan et al. |
| 2017/0316420 | A1 | 11/2017 | Gorny |
| 2018/0121522 | A1 * | 5/2018 | Wang ............ G06Q 10/1053 |
| 2018/0165418 | A1 | 6/2018 | Swartz |
| 2018/0314761 | A1 | 11/2018 | Lewin-Eytan |
| 2018/0374126 | A1 | 12/2018 | Patil et al. |
| 2019/0005515 | A1 | 1/2019 | Higgins et al. |
| 2019/0158902 | A1 | 5/2019 | Thomas |
| 2019/0213266 | A1 | 7/2019 | Sathya et al. |
| 2019/0269354 | A1 * | 9/2019 | Forth ............ A61B 5/7275 |
| 2020/0036667 | A1 | 1/2020 | Talton |
| 2020/0112755 | A1 | 4/2020 | Seshadri |
| 2020/0226655 | A1 | 7/2020 | Bermudez et al. |
| 2022/0138875 | A1 | 5/2022 | Beynel |

OTHER PUBLICATIONS

Platt, John C., "Probabilistic Outputs for Support Vector Machines and Comparisons to Regularized Likelihood Methods," pp. 1-11, http://www.research.microsoft.com/~jplatt, Mar. 26, 1999. 1999.

* cited by examiner

FIG. 8

SYSTEMS AND METHODS FOR BEHAVIOR BASED MESSAGING

CROSS-REFERENCE TO RELATED APPLICATIONS

This application is Continuation Application of U.S. patent application Ser. No. 17/991,463, filed on Nov. 21, 2022, to be issued as U.S. Pat. No. 11,861,473 on Jan. 2, 2024, which is a Continuation Application of U.S. patent application Ser. No. 16/287,686, filed Feb. 27, 2019, patented as U.S. Pat. No. 11,537,973, issued on Dec. 27, 2022. U.S. patent application Ser. No. 17/991,463, U.S. patent application Ser. No. 16/287,686, and U.S. Pat. No. 11,537,973 are incorporated herewith by reference in their entirety.

TECHNICAL FIELD

This disclosure relates generally to messaging protocols, and more specifically to messaging protocols based upon past behavior of a user.

BACKGROUND

Many messages sent over electronic systems suffer from a fatal flaw of being easily ignored. Past systems have attempted to solve this problem by simply increasing a number of messages sent over electronic systems due to the small marginal costs of sending additional messages. This, though, can result in annoying recipients of these messages, which can then result in the messages remaining unopened. Therefore, there is a need for more targeted messaging protocols that result in greater percentages of messages being interacted with.

BRIEF DESCRIPTION OF THE DRAWINGS

To facilitate further description of the embodiments, the following drawings are provided in which:

FIG. 8 illustrates a third representative GUI, according to an embodiment.

Figure 1:
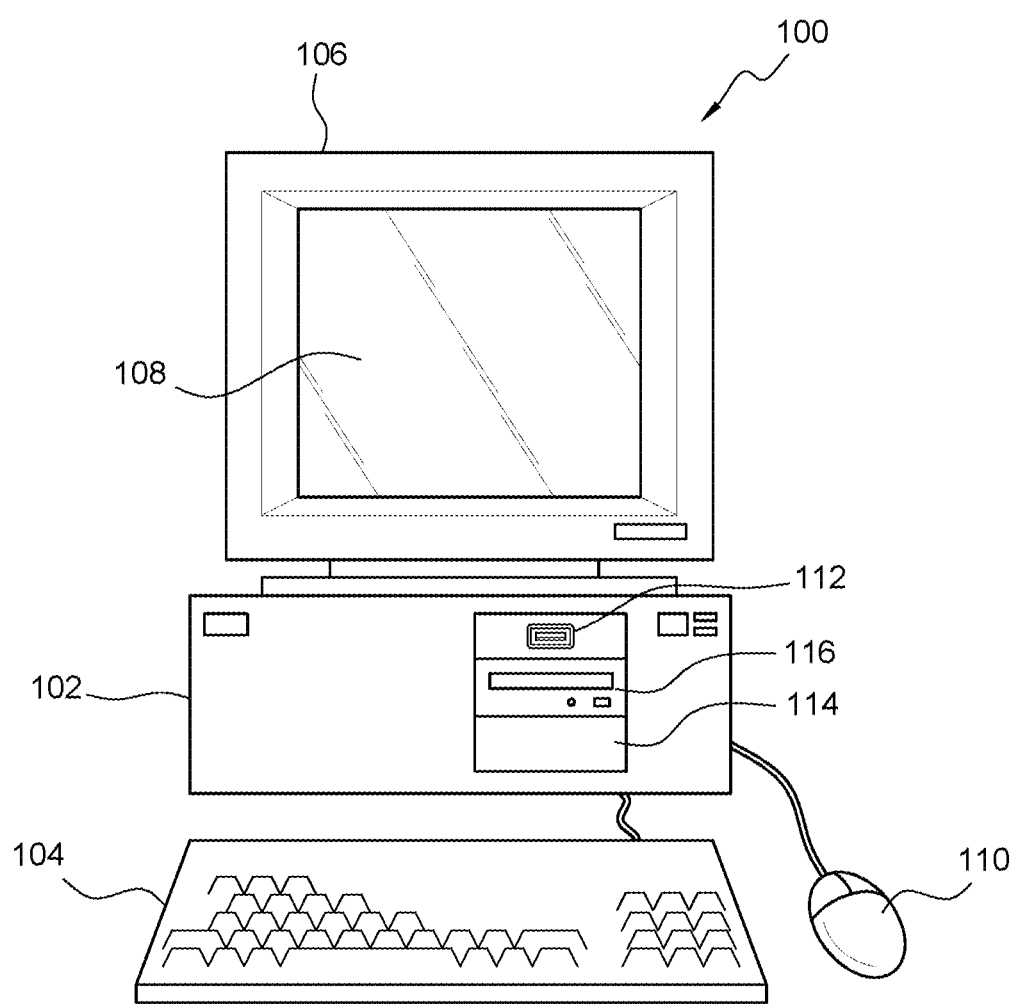
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Description of Examples of Embodiments

A number of embodiments can include a system. The system can include one or more processors and one or more non-transitory storage devices storing computing instructions configured to run on the one or more processors. The computing instructions can be configured to run on the one or more processors and perform acts of collecting historical data of a user; converting the historical data of the user into at least one feature vector; calculating a first user propensity score for the user using the at least one feature vector; calculating a second user propensity score for the user using the at least one feature vector, the second user propensity score representing a different user propensity than the first user propensity score; normalizing the first user propensity score; normalizing the second user propensity score; using the first user propensity score, as normalized, to place the user into a first segment; using the second user propensity score, as normalized, to place the user into a second segment different than the first segment; and facilitating delivery of a message to the user based on the first segment and the second segment.

Various embodiments include a method. The method can include collecting historical data of a user; converting the historical data of the user into at least one feature vector; calculating a first user propensity score for the user using the at least one feature vector; calculating a second user propensity score for the user using the at least one feature vector, the second user propensity score representing a different user propensity than the first user propensity score; normalizing the first user propensity score; normalizing the second user propensity score; using the first user propensity score, as normalized, to place the user into a first segment; using the second user propensity score, as normalized, to place the user into a second segment different than the first segment; and facilitating delivery of a message to the user based on the first segment and the second segment.

Several embodiments include a system. A system can include one or more processors and one or more non-transitory computer-readable media storing computing instructions that, when executed on the one or more processors, cause the one or more processors to perform certain acts. The acts can include calculating a first user propensity score and a second user propensity score for a user based on at least one feature vector of historical data of the user. The first user propensity score can represent first propensities for the user to take first actions. The second user propensity score can represent second propensities for the user to take second actions. The acts also can include using the first user propensity score to place the user into a first segment. The acts further can include using the second user propensity score to place the user into a second segment different than the first segment. The acts additionally can include facilitating delivery of a message to an electronic device of the user based on the first segment and the second segment.

A number of embodiments include a method. A method can include being implemented via execution of computing instructions configured to run at one or more processors and configured to be stored at non-transitory computer-readable media. The method can include calculating a first user propensity score and a second user propensity score for a user based on at least one feature vector of historical data of the user. The first user propensity score can represent first propensities for the user to take first actions. The second user propensity score can represent second propensities for the user to take second actions. The method also can include using the first user propensity score to place the user into a first segment. The method further can include using the second user propensity score to place the user into a second segment different than the first segment. The method additionally can include facilitating delivery of a message to an electronic device of the user based on the first segment and the second segment.

Various embodiments can include a system including one or more processors and one or more non-transitory computer-readable media storing computing instructions that, when executed on the one or more processors, cause the one or more processors to perform certain acts. The acts can include calculating a first user propensity score to take first actions and a second user propensity score to take second actions based on at least one feature vector of historical data of a user. The acts also can include using the first user propensity score to place the user into a first segment. The acts additionally can include using the second user propensity score to place the user into a second segment different than the first segment. The acts also can include facilitating a display of one or more selectable elements of a GUI for the user based on the first segment and the second segment.

A number of embodiments can include a method being implemented via execution of computing instructions configured to run on one or more processors and stored at non-transitory computer-readable media. The method can include calculating a first user propensity score to take first actions and a second user propensity score to take second actions based on at least one feature vector of historical data of a user. The method also can include using the first user propensity score to place the user into a first segment. The method additionally can include using the second user propensity score to place the user into a second segment different than the first segment. The method also can include facilitating a display of one or more selectable elements of a GUI for the user based on the first segment and the second segment.

Figure 2:
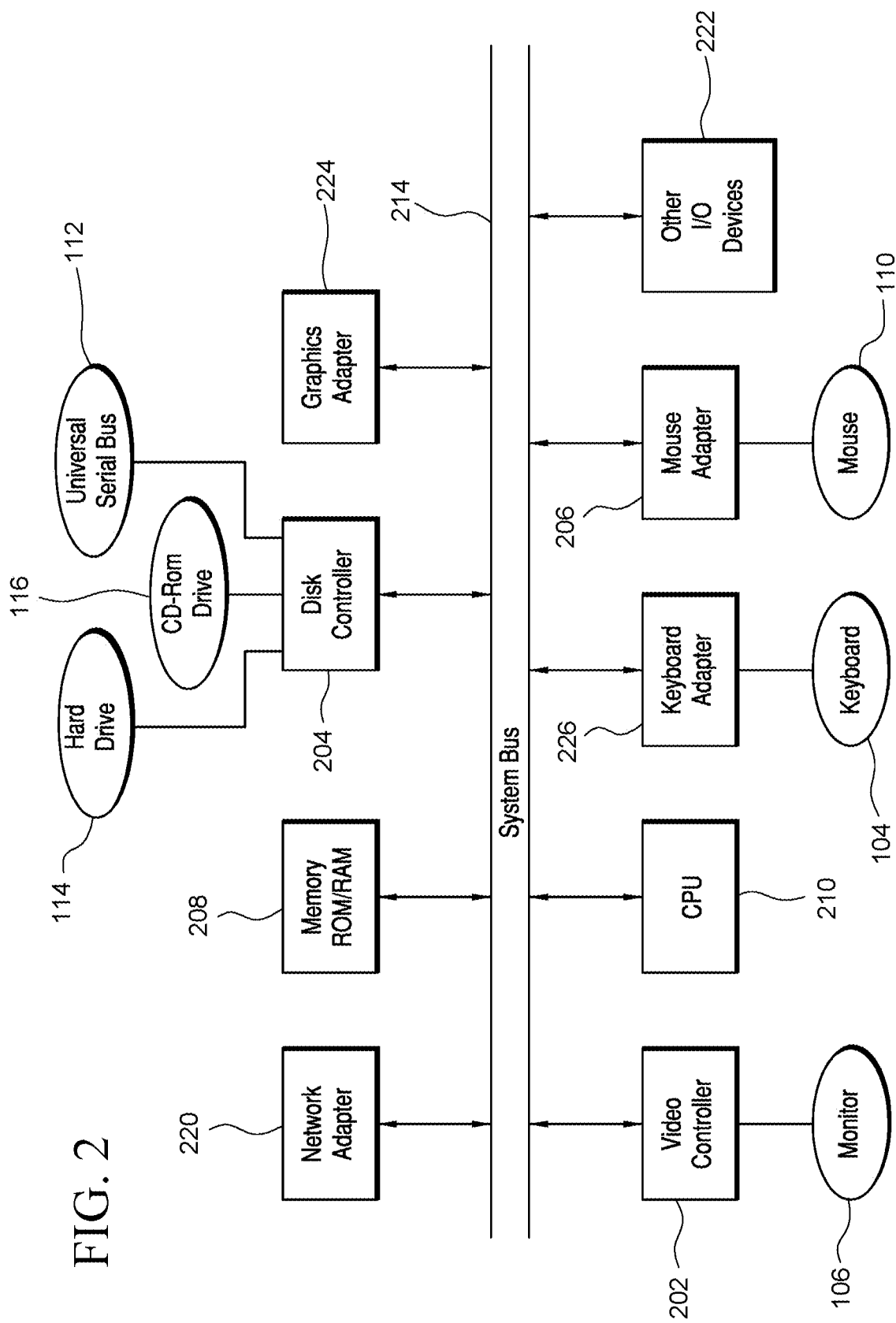
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module (s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
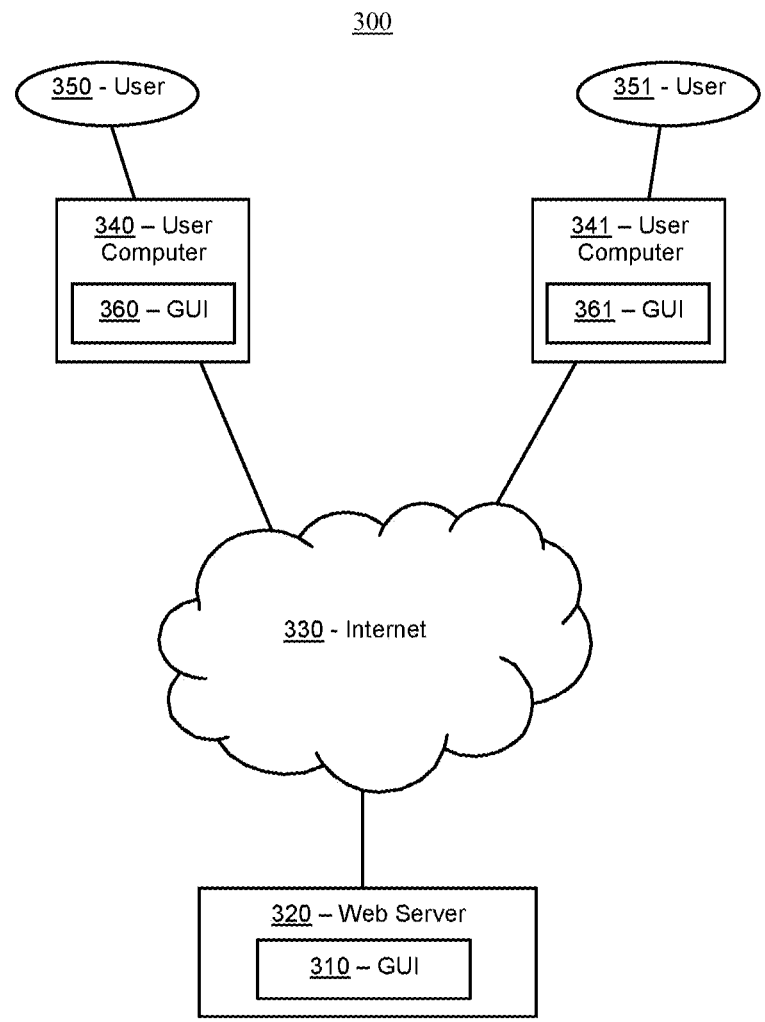
FIG. 3 illustrates a representative block diagram of a system, according to an embodiment.

Turning ahead in the drawings, FIG. 3 illustrates a block diagram of a system 300 that can be employed for sending messages based on user behavior, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include graphical user interface ("GUI") 310, web server 320, internet 330, user computer 410, 341, and/or GUI 360, 361. GUI 310, web server 320, internet 330, user computer 410, 341, and/or GUI 360, 361 can each be a computer system, such as computer system 100 (FIG. 1), as described above, and can each be a single computer, a single server, or a cluster or collection of computers or servers, or a cloud of computers or servers. In another embodiment, a single computer system can host each of two or more of GUI 310, web server 320, internet 330, user computer 410, 341, and/or GUI 360, 361. Additional details regarding GUI 310, web server 320, internet 330, user computer 410, 341, and/or GUI 360, 361 are described herein.

In many embodiments, user computers 340, 341 can comprise any of the elements described in relation to computer system 100. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, GUI 310, web server 320, internet 330, user computer 410, 341, and/or GUI 360, 361 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) GUI 310, web server 320, internet 330, user computer 410, 341, and/or GUI 360, 361 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of GUI 310, web server 320, internet 330, user computer 410, 341, and/or GUI 360, 361. In a similar manner, the processing module(s) and the memory storage module(s) can be local and/or remote to each other.

In many embodiments, GUI 310, web server 320, and/or internet 330 can be configured to communicate with one or more user computers 340 and 341. In some embodiments, user computers 340 and 341 also can be referred to as customer computers. In some embodiments, GUI 310, web server 320, and/or internet 330 can be configured to communicate with one or more user computers 340 and 341 can communicate or interface (e.g., interact) with one or more customer computers (such as user computers 340 and 341) through a network or internet 330. Internet 330 can be a public or private network. For example, internet 330 can be an intranet that is not open to the public. Accordingly, in many embodiments, GUI 310, web server 320, and/or internet 330 can be configured to communicate with one or more user computers 340 and 341 (and/or the software used by such systems) can refer to a back end of system 300 operated by an operator and/or administrator of system 300, and user computers 340, 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

In many embodiments, GUI 310, 360, 361 can be part of and/or displayed by web server 320 and/or user computers 340, 341, which also can be part of system 300. In some embodiments, GUI 310, 360, 361 can comprise text and/or graphics (image) based user interfaces. In the same or different embodiments, GUI 310, 360, 361 can comprise a heads up display ("HUD"). When GUI 310, 360, 361 comprises a HUD, GUI 310, 360, 361 can be projected onto glass or plastic, displayed in midair as a hologram, or displayed on monitor 106 (FIG. 1). In various embodiments, GUI 310, 360, 361 can be color or black and white. In many embodiments, GUI 310, 360, 361 can comprise an application running on a computer system, such as computer system 100, user computers 340, 341, and/or server computer 310. In the same or different embodiments, GUI 310, 360, 361 can comprise a website accessed through internet 320. In some embodiments, GUI 310, 360, 361 can comprise an eCommerce website. In the same or different embodiments, GUI 310, 360, 361 can be displayed as or on a virtual reality (VR) and/or augmented reality (AR) system or display. In many embodiments, GUI 310 can be the same or different than GUI 360, 361.

Meanwhile, in many embodiments, GUI 310, web server 320, internet 330, user computer 410, 341, and/or GUI 360, 361 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between graphical user interface ("GUI") 310, web server 320, internet 330, user computer 410, 341, GUI 360, 361, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for automatic delivery of targeted messages using specific input data and a machine learning model to provide estimates in the face of uncertain outcomes. These techniques described herein can provide a significant improvement over conventional approaches of simply increasing a number of messages sent to increase interaction rates. Further, the techniques described herein can beneficially make determinations based on dynamic information that describes current conditions and/or conditions that have occurred during the same day of a user interaction with a message.

In many embodiments, the techniques described herein can be used continuously at a scale that cannot be handled using manual techniques. For example, a number of daily interactions with messages can exceed a few thousand.

In a number of embodiments, the techniques described herein can solve a technical problem that arises only within the realm of computer networks, as electronic messages do not exist outside the realm of computer networks. Moreover, the techniques described herein can solve a technical problem that cannot be solved outside the context of computer networks. Specifically, the techniques described herein cannot be used outside the context of computer networks, in view of a lack of sufficient data, and because the machine learning model cannot be performed without a computer.

Figure 4:
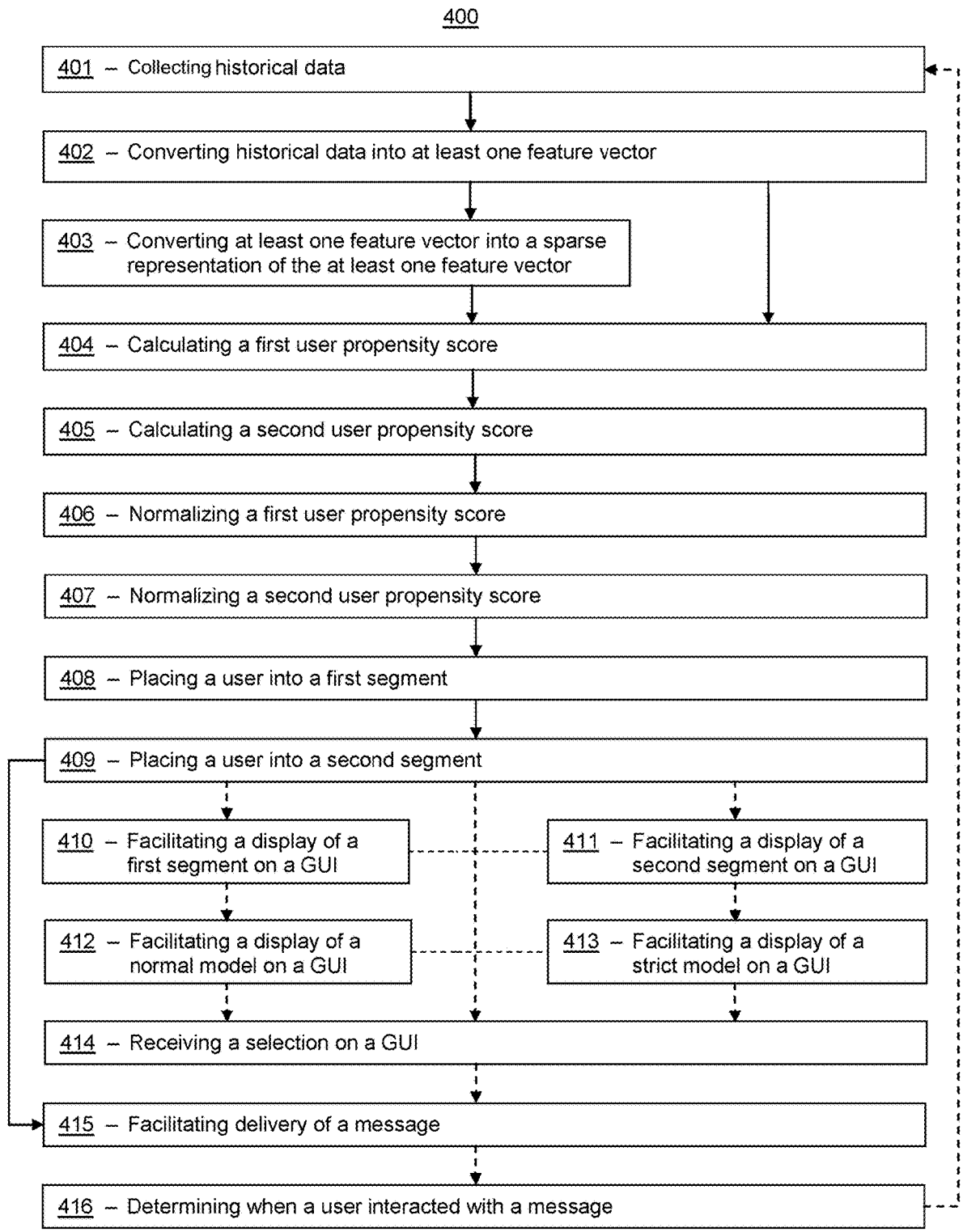
FIG. 4 is a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as graphical user interface ("GUI") 310, web server 320, internet 330, user computer 410, 341, and/or GUI 360, 361 (FIG. 3). The processing module(s) can be similar or identical to the processing module(s) described above with respect to computer system 100 (FIG. 1).

In many embodiments, method 400 can comprise an activity 401 of collecting historical data. In various embodiments, historical data can comprise interactions of a user with a GUI, interactions of a user with a past message, a past geographical location of a user, demographics of a user, a time since a user has opted-into automatic messages, a number of in-store transactions of a user, whether a user owns a home, household size of a user, a device type of a user (e.g. tablet, phone, computer, Apple, Android, etc.) a time of day a user is active on a GUI, and/or a browser type of a user (e.g. Safari, Chrome, Firefox, Edge, etc.). In the same or different embodiments, interactions of a user with a GUI can comprise views of an item of a category of items, cart adds of an item of a category of items, registry adds of an item of a category of items, transactions involving an item of the category of items, searches for the item of the category of items, mouse movements of a user, touch pad movements of a user, touchscreen interactions of a user, and/or eye movements of a user. In various embodiments, interactions of a user with a past message can comprise opening the past message, ignoring the past message, viewing a subject of the past message, viewing a portion of the past message, clicking on a selectable element within the past message (e.g., clicking on a link within an email, entering information into a push notification, etc.), responding to the past message, mouse movements of a user, touch pad movements of a user, touchscreen interactions of a user, and/or eye movements of a user. In many embodiments, historical data can be collected over a specific period of time. In some embodiments, a specific period of time can comprise 1 day, 2 days, 3 days, 4 days, 5 days, 1 month, 2 months, 3 months, 4 months, 5 months, 1 year, 2 years, 3 years, 4 years, 5 years, etc. In some embodiments, activity 401 and other activities in method 400 can comprise using a distributed network comprising distributed memory architecture to gather historical data and to store or save the historical data in memory within the computer system. This distributed architecture can reduce the impact on the network and system resources to reduce congestion in bottlenecks while still allowing data to be accessible from a central location. Using distributed architecture can be especially applicable for gathering historic data because gathering large datasets can reduce processing speeds and increase processing burdens on single processor computer systems as well as increase storage burdens on non-distributed systems.

Further, in many embodiments, historical datasets can be so large that a human cannot reasonably remember them or record them in their entirety.

In many embodiments, method 400 can comprise an activity 402 of converting historical data into at least one feature vector. In various embodiments, a feature vector can be configured to be used in a machine learning algorithm, as described in activities 404-407. In the same or different embodiments, historical data can be stored in the computer system as feature vectors over discrete time periods. In many embodiments, a discrete time period can comprise 1 day, 2 days, 3 days, 4 days, 5 days, 1 month, 2 months, 3 months, 4 months, 5 months, 1 year, 2 years, 3 years, 4 years, 5 years, etc. In the same or different embodiments, a feature vector can comprise a count. In many embodiments, a count can describe interactions of a user with a first GUI, a past geographical location of a user, and/or demographics of a user. In some embodiments, opening the past message, ignoring the past message, viewing a subject of the past message, viewing a portion of the past message, clicking on a selectable element within the past message (e.g., clicking on a link within an email, entering information into a push notification, etc.), responding to the past message, mouse movements of a user, touch pad movements of a user, touchscreen interactions of a user, and/or eye movements of a user. In various embodiments, when interactions of a user with a GUI occur, a count can be added to a feature vector for that interaction. For example, when a user interacts with a website for an item comprising a taxonomy of "Electronics/Camera/SLRcameras/Canon" counts will be added to feature vectors for: "Electronics," "Electronics/Camera," "Electronics/Camera/SLRcameras," and "Electronics/Camera/SLRcameras/Canon." In many embodiments, a feature vector can comprise information about a static attribute of a user. For example, a static attribute can comprise demographic information (e.g., gender, race, age, etc.). In embodiments where a feature vector comprises information about a static attribute of a user, a count can be assigned to a specific value of the static attribute. For example, when a gender of a user comprises male, a count of 20 can be applied to a feature vector for gender, and, when a gender of a user comprises female, a count of 25 can be applied to a feature vector for gender. In embodiments where a feature vector information about interactions of a user with a past message, a count can be added to a feature vector for that interaction. For example, when a user opens a past message and interacts with a selectable element within the past message, a count can be added to viewing a subject of the past message, opening the past message, viewing a portion of the past message, and/or clicking on a selectable element within the past message. In many embodiments, a feature vector can be stored in a database as described above. In some embodiments, activity 402 and other activities in method 400 can comprise using a distributed network comprising distributed memory architecture to convert historical data and store the historical data in memory within the computer system. This distributed architecture can reduce the impact on the network and system resources to reduce congestion in bottlenecks while still allowing data to be accessible from a central location. Using distributed architecture can be especially applicable for converting historic data into at least one feature vector, as storing and/or converting large datasets can reduce storage capacity thereby slowing down non-distributed systems. Further, in many embodiments, converting historical datasets into at least one feature vector can be so time consuming that a human cannot reasonably perform activity 402.

In many embodiments, after activity 402, method 400 can continue with or comprise optional activity 403 of converting at least one feature vector into a sparse representation of the at least one feature vector. Storage efficiency can be improved by encapsulating feature vectors into coarser, conceptual feature vectors by utilizing a technique known as sparse representation. In various embodiments, activity 403 can comprise combining one or more similar feature vectors. As an example, instead of having a plurality of feature vectors representing a number of orders in different departments for a user, these feature vectors can be grouped into one conceptual feature vector that represents orders in the different departments. In some embodiments, a sparse representation of a feature vector can store only non-zero counts for features in the feature vector. Therefore, continuing with the above referenced example, when a user makes purchases only in a small number of departments rather than a large number of departments, many counts in a conceptual feature can be zero, and therefore not stored in the sparse representation of the feature vector. This technique, then, can reduce required storage space, and can consequently make subsequent reading and/or processing of the sparse representation of the feature vector faster than reading and/or processing of one or more feature vectors that are zero. In many embodiments, a sparse representation of a feature vector can be stored in a database as described above.

In many embodiments, method 400 can comprise activity 404 of calculating a first user propensity score. In some embodiments, activity 404 occurs after activity 403, and in other embodiments, activity 404 occurs after activity 402 without performing activity 403. In some embodiments, a first user propensity score of activity 404 can comprise a likelihood of a user interacting with a message. For example, a first user propensity score can comprise a likelihood of a user opening a message, ignoring a message, viewing a subject of a message, viewing a portion of a message, clicking on a selectable element within a message (e.g., clicking on a link within an email, entering information into a push notification, etc.), responding to a message, etc. In the same or different embodiments, a first user propensity score can comprise a likelihood of a user completing a specific action on a GUI. For example, a first user propensity score can comprise a likelihood of a user viewing an item of a category of items, adding an item of a category of items to an electronic shopping cart, adding an item of a category of items to a registry, purchasing an item of a category of items, searching for an item of the category of items, navigating to a specific webpage, and/or selecting (e.g., clicking) an element of a GUI. In many embodiments, a category of items can correlate with a level in an item taxonomy. For example, a category of items can comprise electronics, home improvement, pets, grocery, etc. In various embodiments, an item taxonomy database can store an item taxonomy for a catalogue of items. In many embodiments, an item taxonomy can be configured to classify a catalogue of items based on properties of each item of the catalogue of items. In the same or different embodiments, properties of an item can comprise a title, a description, a price, a brand, a manufacturer, a color, a quantity, a volume, and/or a weight. In some embodiments, an item taxonomy can comprise distinct levels of item classification. In further embodiments, distinct levels of item classification can narrow as they go deeper into an item taxonomy. In various embodiments, distinct levels of item classification can comprise a super department, a department, a category, and/or a sub-category. In many embodiments, a department can be deeper in an item taxonomy than a super department. In the same or different embodiments, a category can be deeper in an item taxonomy than a department. In some embodiments, a sub-category can be deeper in an item taxonomy than a category. For example, an item taxonomy for Shamrock Farms whole milk can comprise a super department of "Eggs and Dairy," a department of "Milk," a category of "Dairy Milk," and a sub-category of "Whole Milk."

In many embodiments, activity 404 can further comprise calculating a first user propensity score using at least one feature vector. In further embodiments, a feature vector in activity 404 can comprise a sparse representation of a feature vector as described in activity 403. In the same or different embodiments, at least one feature vector can be used in a machine learning algorithm. In various embodiments, a machine learning algorithm can comprise an algorithm that iteratively determines equations for calculating probabilities of a user as described above. In some embodiments, a machine learning algorithm can comprise a logistic regression model. In the same or different embodiments, a logistic regression model can comprise an equation comprising:

$$P(x) = \frac{1}{1 + e^{-(\beta_0 + \beta_1 x)}},$$

wherein P(x) comprises a first user propensity score, x comprises a feature vector, $\beta_0$ comprises an intercept of the logistic regression model, and/or $\beta_1$ comprises a coefficient vector a same size as x.

In many embodiments, activity 404 can comprise training a logistic regression model. In some embodiments, training a logistic regression model can comprise estimating internal parameters of a model configured to determine a first propensity score of a user. In various embodiments, a logistic regression model can be trained using labeled training data otherwise known as a training dataset. In many embodiments, a training dataset can comprise all or a part of historical data, as described in activities 401-402, that has been labeled with its outcome (e.g., an interaction with a GUI and/or an interaction with a message) and/or any number of metalabels. In the same or different embodiments, training a logistic regression model can comprise maximizing an equation comprising: $\ell(\beta_0,\beta_1)\Pi_{i:y_i=1}P(x_i)\Pi_{i':y_{i'}=0}(1-P(x_{i'}))$, wherein $\ell$ comprises a likelihood function of $\beta_0$ and/or $\beta_1$, $\beta_0$ comprises an intercept of the logistic regression model, $\beta_1$ comprises a coefficient vector a same size as x, i comprises an index of training instances with a label of 1, i' comprises an index of training instances with a label of 0, y comprises a true label of a training instance of $x_i$, $P(x_i)$ comprises a predicted label of $x_i$ with a label of 1, and/or $P(x_{i'})$ comprises a predicted label of $x_i$ with a label of 0.

In many embodiments, activity 404 can further comprise calculating a first user propensity score with a normal model or a strict model. In some embodiments, a normal model can calculate a first propensity score for a broader and/or larger segment of customers than a strict model. For example, a normal model can predict a probability of a user making a purchase in a home division level in an item taxonomy using feature vectors in the home division as well as feature vectors from an entertainment division, a fashion division, a services division, an enthusiast division, a professional division, and/or an everyday living division. On the other hand, a strict model can predict a probability of a user making a purchase in a home division level in an item taxonomy using feature vectors in only the home division.

In various embodiments, a normal model can be trained on labeled training data (as described above). In the same or different embodiments, a normal model can be trained on labeled training data comprising a plurality of metalabels. In various embodiments, labeled training data comprising a plurality of metalabels can comprise one or more feature vectors tagged with one or more metalabels. In the same or different embodiments, labeled training data comprising a plurality of metalabels can comprise a plurality of feature vectors, where each feature vector of the plurality of feature vectors is tagged with a different metalabel. In many embodiments, a strict model can be trained on labeled training data (as described above). In the same or different embodiments, a strict model can be trained on labeled training data comprising only one metalabel. In various embodiments, labeled training data comprising one metalabel can comprise one or more feature vectors tagged with the same metalabel. In many embodiments, a metalabel can comprise a portion of an item taxonomy, as described above. For example, a metalabel can correspond with a department section of an eCommerce retailer (e.g., electronics, home improvement, pharmacy, pets, grocery, etc.).

In many embodiments, after activity 404, method 400 can comprise activity 405 of calculating a second user propensity score. In some embodiments, a second user propensity score can comprise a likelihood of a user interacting with a message. For example, a second user propensity score can comprise a likelihood of a user opening a message, ignoring a message, viewing a subject of a message, viewing a portion of a message, clicking on a selectable element within a message (e.g., clicking on a link within an email, entering information into a push notification, etc.), responding to a message, etc. In the same or different embodiments, a second user propensity score can comprise a likelihood of a user completing a specific action on a GUI. For example, a second user propensity score can comprise a likelihood of a user viewing of an item of a category of items, adding an item of a category of items to an electronic shopping cart, adding an item of a category of items to a registry, purchasing an item of a category of items, searching for an item of the category of items, navigating to a specific webpage, and/or selecting (e.g., clicking) an element of a GUI. In many embodiments, a category of items can correlate with a level in an item taxonomy. For example, a category of items can comprise electronics, home improvement, pets, grocery, etc. In various embodiments, a second user propensity can be different than a first user propensity score. For example, in embodiments where a first user propensity score comprises a likelihood of a user interacting with a message, a second user propensity score can comprise a likelihood of a user completing a specific action on a GUI (or vice versa).

In many embodiments, activity 405 can further comprise calculating a second user propensity score using at least one feature vector. In further embodiments, a feature vector in activity 404 can comprise a sparse representation of a feature vector, as described in activity 403. In the same or different embodiments, at least one feature vector can be used in a machine learning algorithm. In various embodiments, a machine learning algorithm can comprise an algorithm that iteratively determines equations for calculating probabilities of a user as described above. In some embodiments, a machine learning algorithm can comprise a logistic regression model. In the same or different embodiments, a logistic regression model can comprise an equation comprising:

$$P(x) = \frac{1}{1 + e^{-(\beta_0 + \beta_1 x)}},$$

wherein P(x) comprises a second user propensity score, x comprises a feature vector, $\beta_0$ comprises an intercept of the logistic regression model, and/or $\beta_1$ comprises a coefficient vector a same size as x.

In many embodiments, activity 405 can comprise training a logistic regression model. In some embodiments, training a logistic regression model can comprise estimating internal parameters of a model configured to determine a second propensity score of a user. In various embodiments, a logistic regression model can be trained using labeled training data otherwise known as a training dataset. In many embodiments, a training dataset can comprise all or a part of historical data, as described in activities 401-402, that has been labeled with its outcome (e.g., an interaction with a GUI and/or an interaction with a message) and/or any number of metalabels. In the same or different embodiments, training a logistic regression model can comprise maximizing an equation comprising: $\ell(\beta_0, \beta_1) \Pi_{i:y_i=1} P(x_i) \Pi_{i':y_{i'}=0}(1-P(x_{i'}))$, wherein $\ell$ comprises a likelihood function of $\beta_0$ and/or $\beta_1$, $\beta_0$ comprises an intercept of the logistic regression model, $\beta_1$ comprises a coefficient vector a same size as x, i comprises an index of training instances with a label of 1, i' comprises an index of training instances with a label of 0, y comprises a true label of a training instance of $x_i$ a label 1, and $P(x_i)$ comprises a predicted label of $x_i$ with a label of 1, and/or $P(x_{i'})$ comprises a predicted label of $x_i$ with a label of 0.

In many embodiments, activity 405 can further comprise calculating a second user propensity score with a normal model or a strict model. In some embodiments, a normal model can calculate a second propensity score for a broader and/or larger segment of customers than a strict model. In various embodiments, a normal model can be trained on labeled training data (as described above). In the same or different embodiments, a normal model can be trained on labeled training data comprising a plurality of metalabels. In various embodiments, labeled training data comprising a plurality of metalabels can comprise one or more feature vectors tagged with one or more metalabels. In the same or different embodiments, labeled training data comprising a plurality of metalabels can comprise a plurality of feature vectors, where each feature vector of the plurality of feature vectors is tagged with a different metalabel. In many embodiments, a strict model can be trained on labeled training data (as described above). In the same or different embodiments, a strict model can be trained on labeled training data comprising only one metalabel. In various embodiments, labeled training data comprising one metalabel can comprise one or more feature vectors tagged with the same metalabel. In many embodiments, a metalabel can comprise a portion of an item taxonomy, as described above. For example, a metalabel can correspond with a department section of an eCommerce retailer (e.g., electronics, home improvement, pharmacy, pets, grocery, etc.).

In many embodiments, method 400 can comprise an activity 406 of normalizing a first user propensity score. In some embodiments, when a number of training instances for a first label is lower than a number of training instances for a second label, normalizing a first user propensity score can comprise downsampling instances where a label comprises 0 (e.g., there is no label). In various embodiments, normalizing a first user propensity score can comprise participating instances where a label comprises 1 (e.g., there is a label). In many embodiments, when a number of training instances for a first label is lower than a number of training instances for a second label, normalizing a first user propensity score can comprise using a prior correction technique. In various embodiments, a prior correction technique can be configured to alter propensity scores to better scores reflect an actual probability, while also making propensity scores more comparable across different levels of an item taxonomy. In many embodiments, using a prior correction technique can comprise using an equation comprising $$\widehat{\beta_0} = \ln\left[\left(\frac{1-\tau}{\tau}\right)\left(\frac{\bar{y}}{1-\bar{y}}\right)\right],$$

wherein $\widehat{\beta_0}$ comprises an intercept of a logistic regression model, $\tau$ comprises a fraction of ones in a population, and $\bar{y}$ comprises a fraction of ones in a sample.

In many embodiments, method 400 can comprise an activity 407 of normalizing a second user propensity score. In the same or different embodiments, when a number of training instances for a first label is lower than a number of training instances for a second label, normalizing a second user propensity score can comprise downsampling instances where a label comprises 0 (e.g., there is no label). In various embodiments, when a number of training instances for a first label is lower than a number of training instances for a second label, normalizing a second user propensity score can comprise participating instances where a label comprises 1 (e.g., there is a label). In some embodiments, normalizing a second user propensity score can comprise using a prior correction technique. In various embodiments, a prior correction technique can be configured to alter propensity scores to better scores reflect an actual probability, while also making propensity scores more comparable across different levels of an item taxonomy. In many embodiments, using a prior correction technique can comprise using an equation comprising $$\widehat{\beta_0} = \ln\left[\left(\frac{1-\tau}{\tau}\right)\left(\frac{\bar{y}}{1-\bar{y}}\right)\right],$$

wherein $\widehat{\beta_0}$ comprises an intercept of a logistic regression model, $\tau$ comprises a fraction of ones in a population, and $\bar{y}$ comprises a fraction of ones in a sample.

Activity 407 occurs after activity 405, and similarly, activity 406 occurs after activity 404. Also, activity 407 can occur before or after activity 404 and/or 406, and similarly, activity 406 can occur before or after activity 405 and/or 407.

Figure 6:
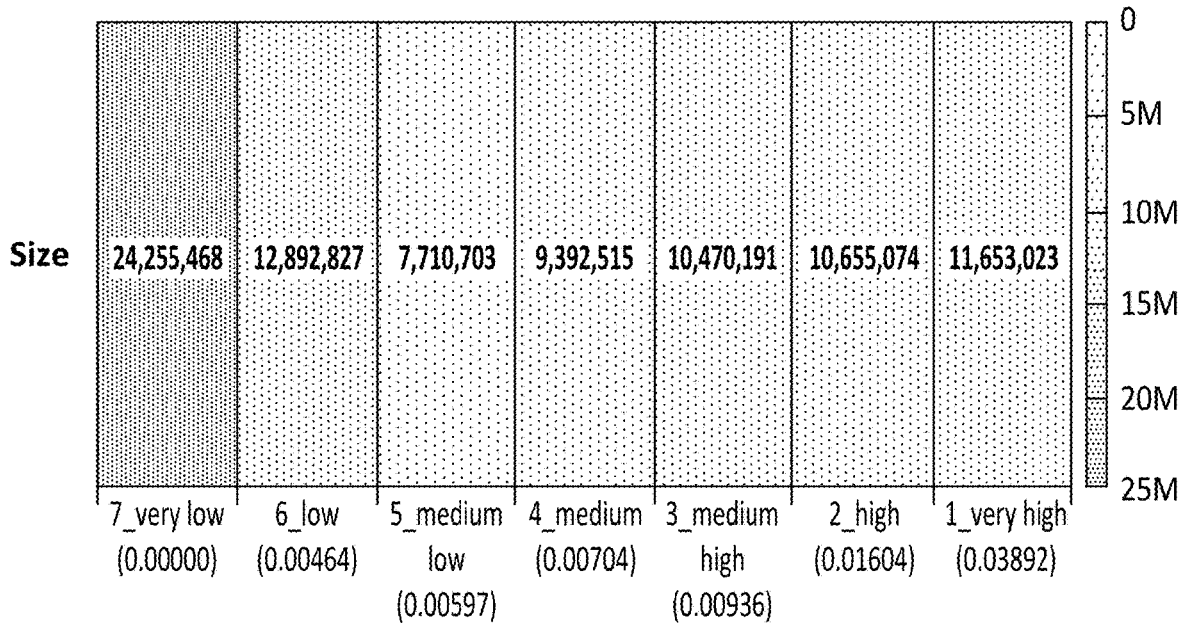
FIG. 6 illustrates a representative graphical user interface ("GUI"), according to an embodiment.

Continuing with method 400, in many embodiments, method 400 can comprise an activity 408 of placing a user into a first segment. In various embodiments, placing a user into a first segment can be done based upon a first user propensity score. In the same or different embodiments, placing a user into a first segment can be done based upon a normalized first user propensity score. For example, in one embodiment, FIG. 6 displays a distribution of users segmented by a first propensity score labeled from very low to very high. A number of users in each segment is displayed within each segment, and approximate first propensity scores or normalized first propensity scores for each segment are displayed in parentheses below the label.

Figure 7:
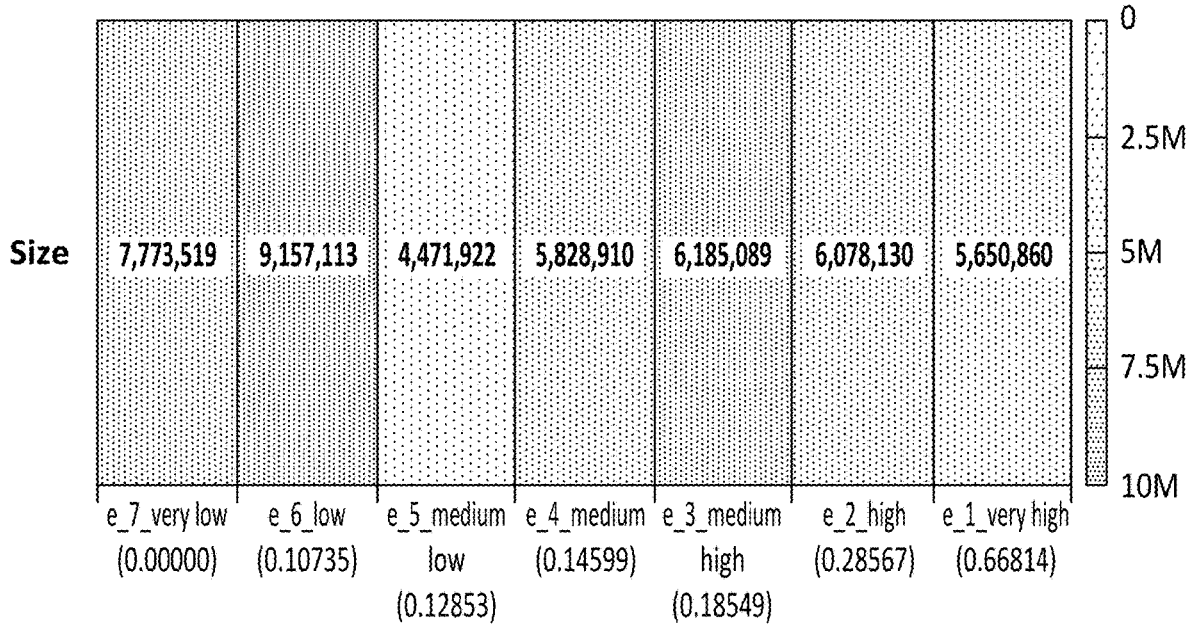
FIG. 7 illustrates a second representative GUI, according to an embodiment.

Returning to FIG. 4, in many embodiments, method 400 can comprise an activity 409 of placing a user into a second segment. In various embodiments, placing a user into a second user segment can be done based upon a second user propensity score. In some embodiments, a second segment can be different than a first segment much like a first propensity score can be different than a second propensity score, as described in activity 405. In the same or different embodiments, placing a user into a second segment can be done based upon a normalized second user propensity score. For example, in one embodiment, FIG. 7 displays a distribution of users segmented by a second propensity score labeled from very low to very high. A number of users in each segment is displayed within each segment, and approximate second propensity scores or normalized second propensity scores for each segment are displayed in parentheses below the label.

Figure 9:
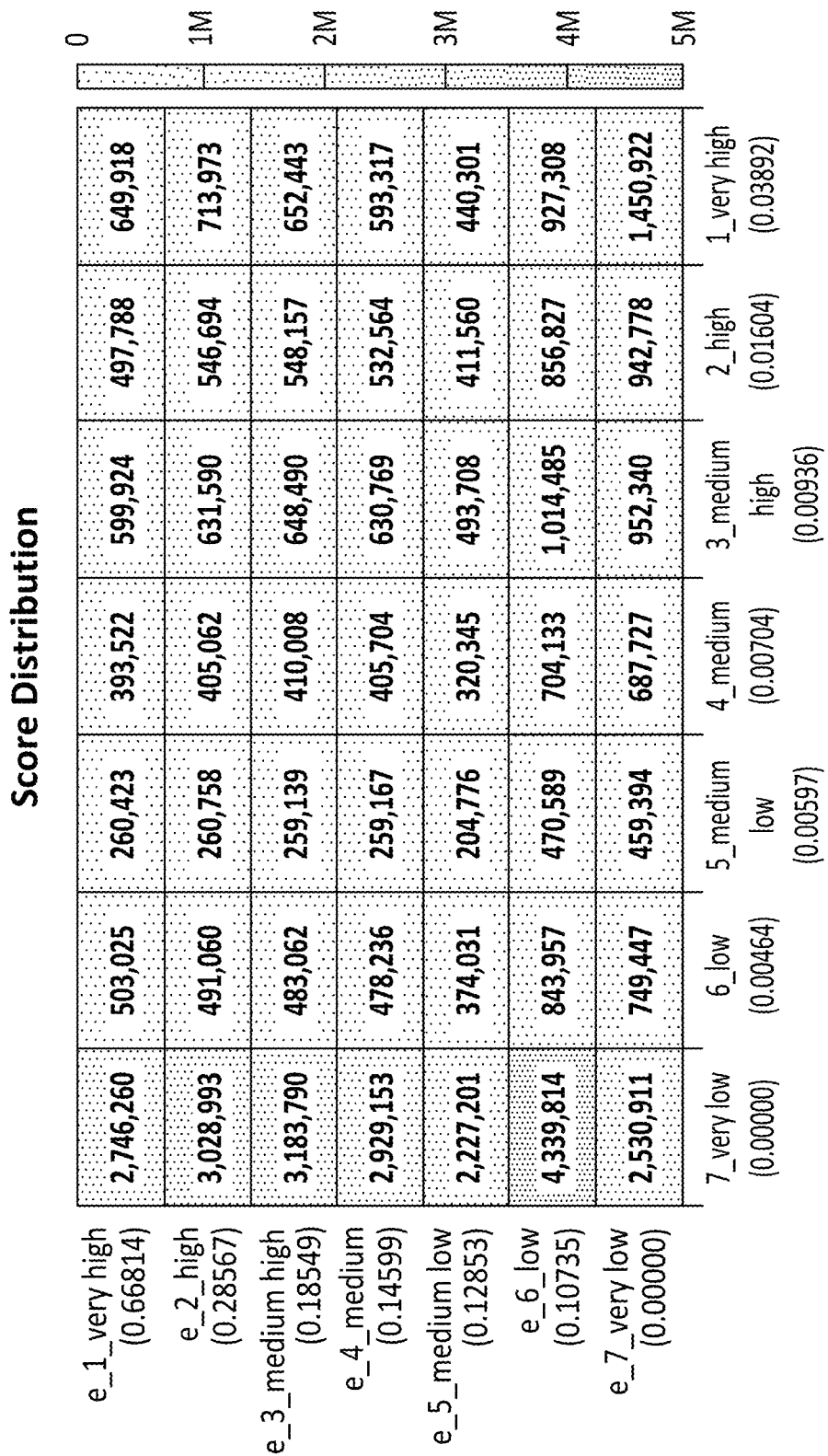
FIG. 9 illustrates a fourth representative GUI, according to an embodiment.

In many embodiments, a first segment and a second segment can be displayed in a same table. For example, FIG. 9 displays an embodiment where an x axis comprises a first user propensity score, as described above, and a y axis comprises a second user propensity score as described above. In this way, an administrator of a system and/or method can further stratify users into segments and/or combinations of segments.

Returning, again, to FIG. 4, activity 409 occurs after activities 405 and 407, and similarly, activity 408 occurs after activities 404 and 406. Also, activity 409 can occur before or after activities 404, 406, and 408, and similarly, activity 408 can occur before or after activities 405, 407, and 409. In many embodiments, activities 404-409 can occur in parallel (e.g., at the same time) with each other.

Figure 8:
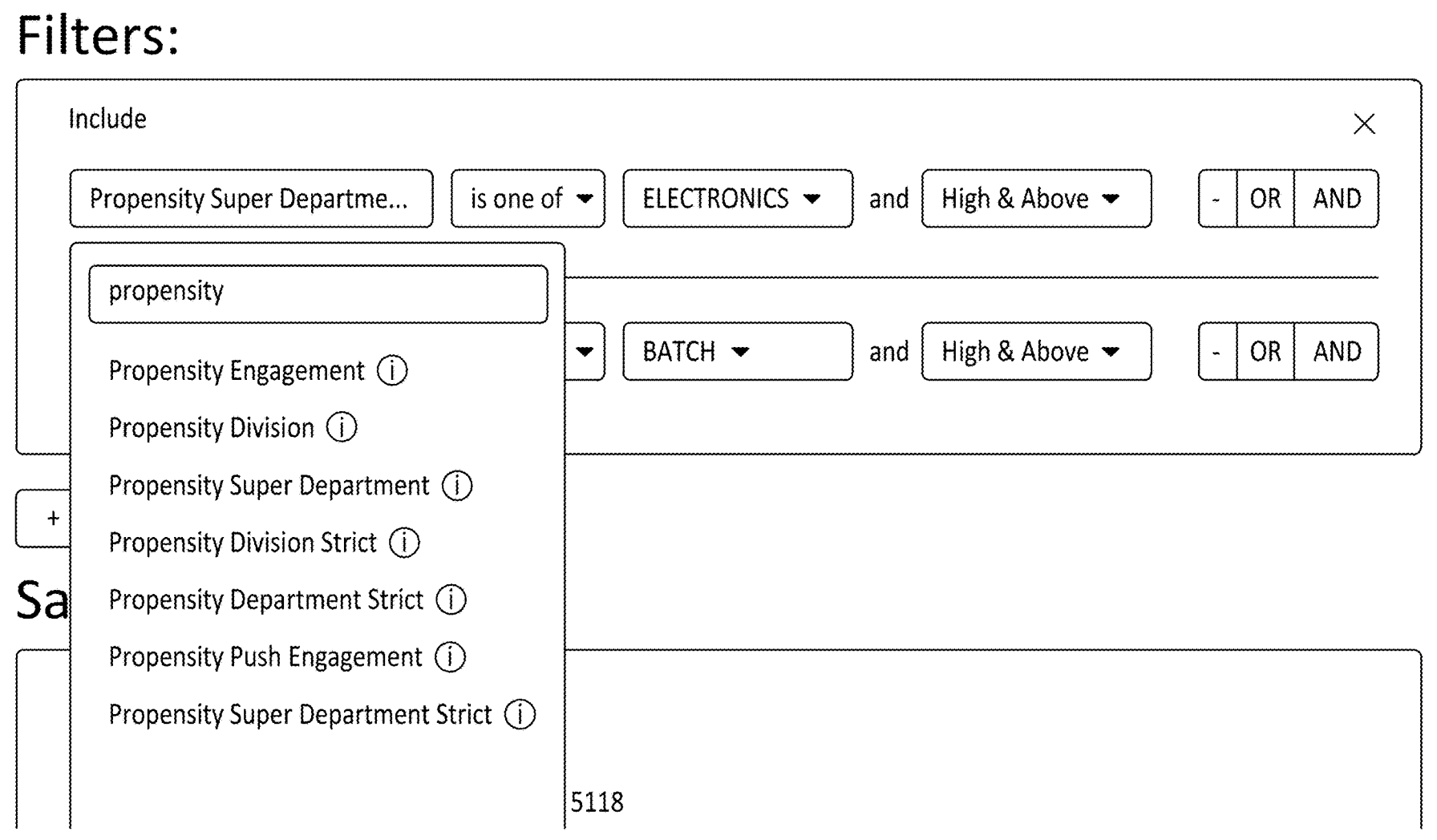

Continuing with method 400, in many embodiments, method 400 can comprise an activity 410 of facilitating a display of a first segment on a GUI. In many embodiments, a first segment can be displayed on a GUI as one or more selectable elements (e.g., buttons and/or checkboxes) displayed on the GUI. In the same or different embodiments, a first segment can be displayed as a part of a drop down menu as shown in FIG. 8. In some embodiments, a first segment can be displayed as a search result after a search is completed by an administrator of method 400, as shown in FIG. 8.

In many embodiments, method 400 can comprise an activity 411 of facilitating a display of a second segment on a GUI. In many embodiments, a second segment can be displayed on a GUI as one or more selectable elements (e.g., buttons and/or checkboxes) displayed on the GUI. In the same or different embodiments, a second segment can be displayed as a part of a drop down menu as shown in FIG. 8. In some embodiments, a second segment can be displayed as a search result after a search is completed by an administrator of method 400, as shown in FIG. 8.

Returning to FIG. 4, in many embodiments, method 400 can comprise an activity 412 of facilitating a display of a normal model on a GUI. In many embodiments, a normal model can be displayed on a GUI as one or more selectable elements (e.g., buttons and/or checkboxes) displayed on the GUI. In the same or different embodiments, a normal model can be displayed as a part of a drop down menu as shown in FIG. 8. In some embodiments, a normal model can be displayed as a search result after a search is completed by an administrator of method 400 (FIG. 4), as shown in FIG. 8.

Returning, again, to FIG. 4, in many embodiments, method 400 can comprise an activity 413 of facilitating a display of a strict model on a GUI. In various embodiments, activity 413 can occur at the same time or in conjunction with activity 412 as described above. In many embodiments, a strict model can be displayed on a GUI as one or more selectable elements (e.g., buttons and/or checkboxes) displayed on the GUI. In the same or different embodiments, a strict model can be displayed as a part of a drop down menu as shown in FIG. 8. In some embodiments, a strict model can be displayed as a search result after a search is completed by an administrator of method 400 (FIG. 4), as shown in FIG. 8.

Activity 413 can occur after activity 411, and similarly, activity 412 can occur after activity 410. Also, activities 411 and 413, if performed, occur after activities 405, 407, and 409, and can occur before or after activities 404, 406, 408, 410, and/or 412. Similarly, activities 410 and 412, if performed, occur after activities 404, 406, and 408, and can occur before or after activities 405, 407, 409, 411, and/or 413.

In many embodiments, after activity 409, method 400 can comprise an activity 414 of receiving a selection on a GUI. Activity 414 also can occur after activity 410, 411, 412, and/or 413, if one or more of activities 410, 411, 412, and 413 are performed. For example, in some embodiments, only activities 410 and 411 are performed, and activities 412 and 413 are not performed.

In further embodiments, activity 414 can comprise receiving a plurality of selections on a GUI. In the same or different embodiments, a selection on a GUI can comprise a selection of a selectable element, a drop down menu, and/or a search result. In various embodiments, a selection on a GUI can comprise a selection of a first segment, a selection of a second segment, a selection of a normal model, and/or a selection of a strict model. In many embodiments, activity 414 can further comprise filtering a set of users based upon a selection received from a GUI. For example, when a selection on a GUI comprises a first segment, users not in a first segment can be removed from a set to create a subset. As another example, when a selection on a GUI comprises a strict model, users not identified as having a propensity score can be removed from a set to create a subset. As a further example, when a selection on a GUI comprises a first segment and a strict model, users not in the first segment or not identified as having a propensity score can be removed, thereby creating a subset of users in a first subset and identified as having a propensity score by the strict model.

In many embodiments, method 400 can comprise an activity 415 of facilitating delivery of a message. In some embodiments, a message can comprise text, images, and/or audio transmitted to an electronic device. For example, a message can comprise an email, a text message (e.g., SMS or MMS), a direct message, a push notification, a voicemail, a voice memo, etc. In various embodiments, a message can be delivered to only a subset of users, as described in activity 414. In the same or different embodiments, a message can comprise information about metalabels used to train a normal model and/or a strict model depending on which is selected in activities 412-413. In many embodiments, a message can be delivered to only users in a first segment and/or a second segment depending on which is selected in activities 410-411. Activity 415 occurs after activity 408 and/or 409, and can occur after activity 414, if performed.

In many embodiments, after activity 415, method 400 can comprise an activity 416 of determining when a user interacted with a message. In the same or different embodiments, a user can interact with a message when opening the message, ignoring the message, viewing a subject of the message, viewing a portion of the message, clicking on a selectable element within the message (e.g., clicking on a link within an email, entering information into a push notification, etc.), responding to the message, moving a mouse over the message, moving a touch pad pointer over a message, tapping/touching or hovering over the message on a touchscreen device, and/or looking at a message on a device with gaze tracking technology. In many embodiments, activity 416 can further comprise adding data (comprising when a user has interacted with or ignored a message) to historical data as described in activity 401. In this way, machine learning algorithms used to calculate user propensity scores can be further refined and made more accurate.

Figure 5:
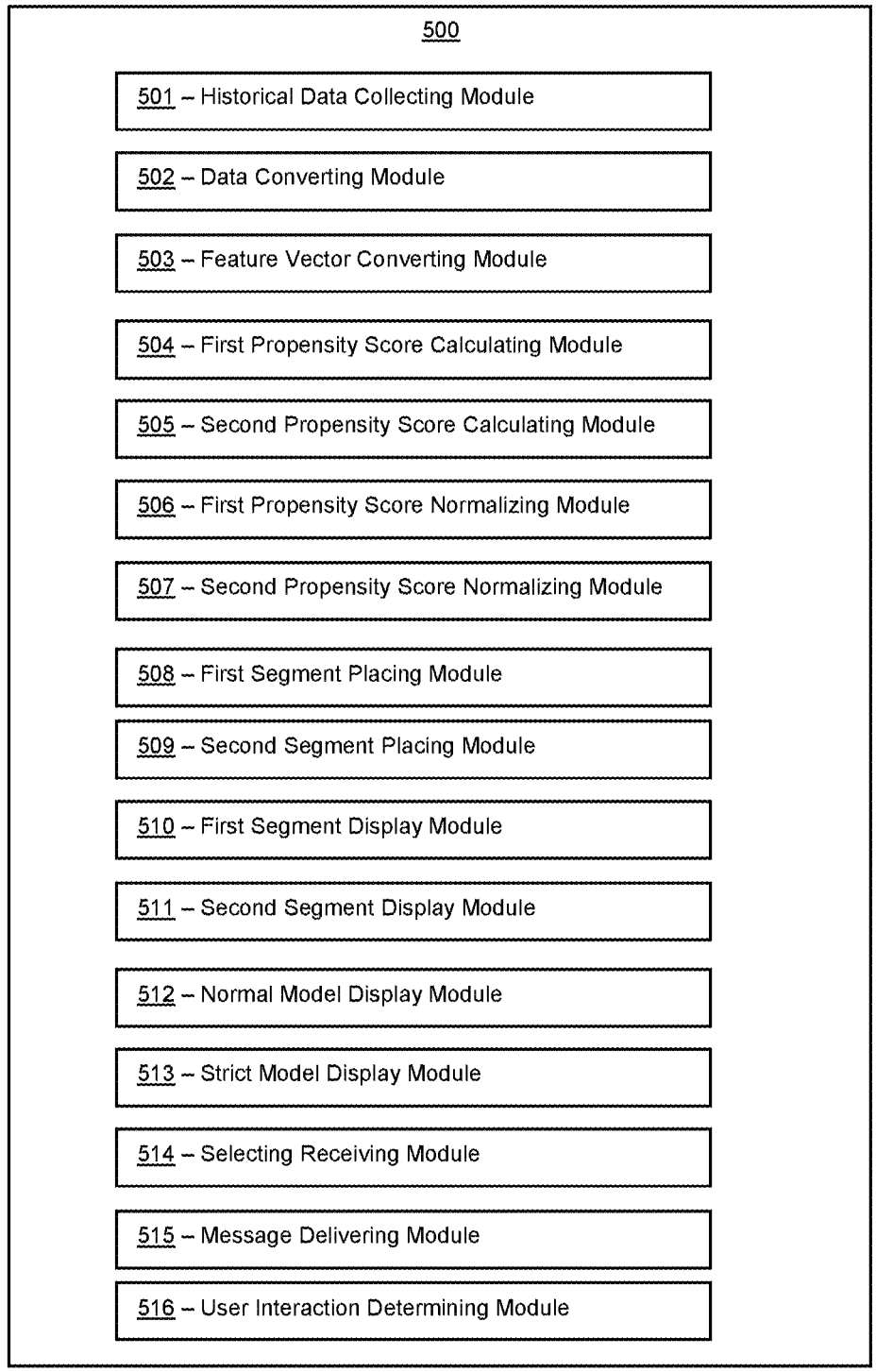
FIG. 5 illustrates a representative block diagram of a portion of a system, according to an embodiment.

Turning ahead in the drawings, FIG. 5 illustrates a block diagram of a system 500 that can be employed for behavior based messaging. System 500 is merely exemplary and embodiments of the system are not limited to the embodiments presented herein. System 500 can be employed in many different embodiments or examples not specifically depicted or described herein. In some embodiments, certain elements or modules of system 700 can perform various procedures, processes, and/or activities. In these or other embodiments, the procedures, processes, and/or activities can be performed by other suitable elements or modules of system 500.

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise non-transitory memory storage module 501. Memory storage module 501 can be referred to as historical data collecting module 501. In many embodiments, historical data collecting module 501 can store computing instructions configured to run on one or more processing modules and perform one or more acts of method 400 (FIG. 4) (e.g., activity 401 (FIG. 4)).

In many embodiments, system 500 can comprise non-transitory memory storage module 502. Memory storage module 502 can be referred to as data converting module 502. In many embodiments, data converting module 502 can store computing instructions configured to run on one or more processing modules and perform one or more acts of method 400 (FIG. 4) (e.g., activity 402 (FIG. 4)).

In many embodiments, system 500 can comprise non-transitory memory storage module 503. Memory storage module 503 can be referred to as feature vector converting module 503. In many embodiments, feature vector converting module 503 can store computing instructions configured to run on one or more processing modules and perform one or more acts of method 400 (FIG. 4) (e.g., activity 403 (FIG. 4)).

In many embodiments, system 500 can comprise non-transitory memory storage module 504. Memory storage module 504 can be referred to as first propensity score calculating module 504. In many embodiments, first propensity score calculating module 504 can store computing instructions configured to run on one or more processing modules and perform one or more acts of method 400 (FIG. 4) (e.g., activity 404 (FIG. 4)).

In many embodiments, system 500 can comprise non-transitory memory storage module 505. Memory storage module 505 can be referred to as second propensity score calculating module 505. In many embodiments, second propensity score calculating module 505 can store computing instructions configured to run on one or more processing modules and perform one or more acts of method 400 (FIG. 4) (e.g., activity 405 (FIG. 4)).

In many embodiments, system 500 can comprise non-transitory memory storage module 506. Memory storage module 506 can be referred to as first propensity score normalizing module 506. In many embodiments, first propensity score normalizing module 506 can store computing instructions configured to run on one or more processing modules and perform one or more acts of method 400 (FIG. 4) (e.g., activity 406 (FIG. 4)).

In many embodiments, system 500 can comprise non-transitory memory storage module 507. Memory storage module 507 can be referred to as second propensity score normalizing module 507. In many embodiments, second propensity score normalizing module 507 can store computing instructions configured to run on one or more processing modules and perform one or more acts of method 400 (FIG. 4) (e.g., activity 407 (FIG. 4)).

In many embodiments, system 500 can comprise non-transitory memory storage module 508. Memory storage module 508 can be referred to as first segment placing module 508. In many embodiments, first segment placing module 508 can store computing instructions configured to run on one or more processing modules and perform one or more acts of method 400 (FIG. 4) (e.g., activity 408 (FIG. 4)).

In many embodiments, system 500 can comprise non-transitory memory storage module 509. Memory storage module 509 can be referred to as second segment placing module 509. In many embodiments, second segment placing module 509 can store computing instructions configured to run on one or more processing modules and perform one or more acts of method 400 (FIG. 4) (e.g., activity 409 (FIG. 4)).

In many embodiments, system 500 can comprise non-transitory memory storage module 510. Memory storage module 510 can be referred to as first segment display module 510. In many embodiments, first segment display module 510 can store computing instructions configured to run on one or more processing modules and perform one or more acts of method 400 (FIG. 4) (e.g., activity 410 (FIG. 4)).

In many embodiments, system 500 can comprise non-transitory memory storage module 511. Memory storage module 511 can be referred to as second segment display module 511. In many embodiments, first segment display module 511 can store computing instructions configured to run on one or more processing modules and perform one or more acts of method 400 (FIG. 4) (e.g., activity 411 (FIG. 4)).

In many embodiments, system 500 can comprise non-transitory memory storage module 512. Memory storage module 512 can be referred to as normal model display module 512. In many embodiments, normal model display module 512 can store computing instructions configured to run on one or more processing modules and perform one or more acts of method 400 (FIG. 4) (e.g., activity 412 (FIG. 4)).

In many embodiments, system 500 can comprise non-transitory memory storage module 513. Memory storage module 513 can be referred to as strict model display module 513. In many embodiments, strict model display module 513 can store computing instructions configured to run on one or more processing modules and perform one or more acts of method 400 (FIG. 4) (e.g., activity 413 (FIG. 4)).

In many embodiments, system 500 can comprise non-transitory memory storage module 514. Memory storage module 514 can be referred to as selection receiving module 514. In many embodiments, selection receiving module 514 can store computing instructions configured to run on one or more processing modules and perform one or more acts of method 400 (FIG. 4) (e.g., activity 414 (FIG. 4)).

In many embodiments, system 500 can comprise non-transitory memory storage module 515. Memory storage module 515 can be referred to as message delivering module 515. In many embodiments, message delivering module 515 can store computing instructions configured to run on one or more processing modules and perform one or more acts of method 400 (FIG. 4) (e.g., activity 415 (FIG. 4)).

In many embodiments, system 500 can comprise non-transitory memory storage module 516. Memory storage module 516 can be referred to as user interaction determining module 516. In many embodiments, user interaction determining module 516 can store computing instructions configured to run on one or more processing modules and perform one or more acts of method 400 (FIG. 4) (e.g., activity 416 (FIG. 4)).

Although systems and methods for behavior based messaging have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed:

1. A system comprising:
    one or more processors; and
    one or more non-transitory computer-readable media storing computing instructions that, when executed on the one or more processors, cause the one or more processors to perform functions comprising:
        calculating a first user propensity score to take first actions and a second user propensity score to take second actions based on at least one feature vector of historical data of a user;
        using the first user propensity score to place the user into a first segment;
        using the second user propensity score to place the user into a second segment different than the first segment; and
        facilitating a display of one or more selectable elements on a GUI of the user based on the first segment and the second segment.

2. The system of claim 1, wherein the computing instructions, when executed on the one or more processors, further cause the one or more processors to perform functions comprising:
    collecting the historical data of the user;
    converting the historical data of the user into the at least one feature vector;
    calculating the second user propensity score using the at least one feature vector, wherein the second user propensity score represents a different user propensity than the first user propensity score;
    normalizing the first user propensity score; and
    normalizing the second user propensity score.

3. The system of claim 2, wherein normalizing the first user propensity score comprises using a prior correction technique.

4. The system of claim 1, wherein calculating the first user propensity score comprises:
    using a normal model to calculate the first user propensity score for a broader first segment of users than a strict model.

5. The system of claim 4, wherein the computing instructions, when executed on the one or more processors, further cause the one or more processors to perform functions comprising:
    training the normal model using labeled training data from a plurality of metalabels; and
    training the strict model using labeled training data from one metalabel.

6. The system of claim 4, wherein the computing instructions, when executed on the one or more processors, further cause the one or more processors to perform functions comprising:
    filtering a set of users into a subset of the users of both the first segment and the second segment; and
    delivering, using the strict model, messages to the subset of the users, wherein the messages comprise information about a metalabel.

7. The system of claim 1, wherein calculating the first user propensity score for the user based on the at least one feature vector comprises:
    iteratively determining, using a machine learning algorithm, equations for calculating probabilities of the user.

8. The system of claim 7, wherein the machine learning algorithm comprises a logistic regression model.

9. The system of claim 1, wherein the computing instructions, when executed on the one or more processors, further cause the one or more processors to perform functions comprising:
    converting the at least one feature vector into a sparse representation of the at least one feature vector; and
    storing the sparse representation of the at least one feature vector in a database.

10. The system of claim 1, wherein the computing instructions, when executed on the one or more processors, further cause the one or more processors to perform functions comprising:
 determining when the user interacted with a message;
 determining when the user ignored the message; and
 adding data to the historical data, wherein the data comprises a date and a time when the user interacted with the message or ignored the message.

11. A method being implemented via execution of computing instructions configured to run on one or more processors and stored at non-transitory computer-readable media, the method comprising:
 calculating a first user propensity score to take first actions and a second user propensity score to take second actions based on at least one feature vector of historical data of a user;
 using the first user propensity score to place the user into a first segment;
 using the second user propensity score to place the user into a second segment different than the first segment; and
 facilitating a display of one or more selectable elements on a GUI of the user based on the first segment and the second segment.

12. The method of claim 11 further comprising:
 collecting the historical data of the user;
 converting the historical data of the user into the at least one feature vector;
 calculating the second user propensity score using the at least one feature vector, wherein the second user propensity score represents a different user propensity than the first user propensity score;
 normalizing the first user propensity score; and
 normalizing the second user propensity score.

13. The method of claim 12, wherein normalizing the first user propensity score comprises using a prior correction technique.

14. The method of claim 11, wherein calculating the first user propensity score comprises:
 using a normal model to calculate the first user propensity score for a broader first segment of users than a strict model.

15. The method of claim 14 further comprising:
 training the normal model using labeled training data from a plurality of metalabels; and
 training the strict model using labeled training data from one metalabel.

16. The method of claim 14 further comprising:
 (a)
 filtering a set of users into a subset of the users of both the first segment and the second segment; and
 delivering, using the strict model, messages to the subset of the users, wherein the messages comprise information about a metalabel; or
 (b)
 determining when the user interacted with a message;
 determining when the user ignored the message; and
 adding data to the historical data, wherein the data comprises a date and a time when the user interacted with the message or ignored the message.

17. The method of claim 11, wherein calculating the first user propensity score for the user based on the at least one feature vector comprises:
 iteratively determining, using a machine learning algorithm, equations for calculating probabilities of the user.

18. The method of claim 17, wherein the machine learning algorithm comprises a logistic regression model.

19. The method of claim 11 further comprising:
 converting the at least one feature vector into a sparse representation of the at least one feature vector; and
 storing the sparse representation of the at least one feature vector in a database.

20. A non-transitory computer-readable medium storing instructions, wherein the instructions, upon execution by a processor, cause the processor to perform operations comprising:
 calculating a first user propensity score to take a first action and a second user propensity score to take a second action based on a feature vector of historical data of a user;
 using the first user propensity score to place the user into a first segment;
 using the second user propensity score to place the user into a second segment different than the first segment; and
 facilitating a display of one or more selectable elements on a GUI of the user based on the first segment and the second segment.

* * * * *